(12) United States Patent
Mukherjee et al.

(10) Patent No.: US 11,670,804 B2
(45) Date of Patent: Jun. 6, 2023

(54) SCALABLE SILICON ANODES AND THE ROLE OF PARYLENE FILMS IN IMPROVING ELECTRODE PERFORMANCE CHARACTERISTICS IN ENERGY STORAGE SYSTEMS

(71) Applicant: Rensselaer Polytechnic Institute, Troy, NY (US)

(72) Inventors: Rahul Mukherjee, Troy, NY (US); Eklavya Singh, Troy, NY (US); Nikhil Koratkar, Clifton Park, NY (US); Toh-Ming Lu, Watervliet, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 73 days.

(21) Appl. No.: 17/324,271

(22) Filed: May 19, 2021

(65) Prior Publication Data
US 2021/0367281 A1    Nov. 25, 2021

Related U.S. Application Data

(62) Division of application No. 15/326,736, filed as application No. PCT/US2015/042635 on Jul. 29, 2015, now Pat. No. 11,024,889.
(Continued)

(51) Int. Cl.
*H01M 10/42* (2006.01)
*H01M 4/133* (2010.01)
(Continued)

(52) U.S. Cl.
CPC ..... *H01M 10/4235* (2013.01); *H01M 4/0402* (2013.01); *H01M 4/133* (2013.01);
(Continued)

(58) Field of Classification Search
CPC .......... H01M 10/052; H01M 10/0525; H01M 10/4235; H01M 12/08; H01M 2004/027;
(Continued)

(56) References Cited

U.S. PATENT DOCUMENTS

| 4,624,902 A | 11/1986 | deNeufville et al. |
| 4,707,422 A | 11/1987 | deNeufville et al. |

(Continued)

FOREIGN PATENT DOCUMENTS

| DE | 102008011523 A1 | 8/2009 |
| WO | 2013076260 A1 | 5/2013 |

OTHER PUBLICATIONS

International Search Report and The Written Opinion of the International Searching Authority, International Application No. PCT/US2015/042635, dated Sep. 22, 2015.
(Continued)

*Primary Examiner* — Victoria H Lynch
(74) *Attorney, Agent, or Firm* — Murtha Cullina LLP; Anthony P. Gangemi

(57) ABSTRACT

A lithium-based energy storage system includes an electrolyte and an electrode. The electrode has a conformal coating of parylene. The parylene forms an artificial solid electrolyte interface (SEI). The electrode may include a material chosen from silicon, graphene-silicon composite, carbon-sulfur, and lithium. The use of parylene to form a conformal coating on an electrode in a lithium-based energy storage system is also disclosed.

9 Claims, 5 Drawing Sheets

Related U.S. Application Data

(60) Provisional application No. 62/031,169, filed on Jul. 31, 2014.

(51) Int. Cl.

| | | |
|---|---|---|
| *H01M 4/134* | (2010.01) | |
| *H01M 4/1393* | (2010.01) | |
| *H01M 4/1395* | (2010.01) | |
| *H01M 4/36* | (2006.01) | |
| *H01M 4/38* | (2006.01) | |
| *H01M 10/052* | (2010.01) | |
| *H01M 4/04* | (2006.01) | |
| *H01M 4/587* | (2010.01) | |
| *H01M 4/62* | (2006.01) | |
| *H01M 10/0525* | (2010.01) | |
| *H01M 12/08* | (2006.01) | |
| *H01M 4/02* | (2006.01) | |

(52) U.S. Cl.
CPC ......... *H01M 4/134* (2013.01); *H01M 4/1393* (2013.01); *H01M 4/1395* (2013.01); *H01M 4/364* (2013.01); *H01M 4/366* (2013.01); *H01M 4/382* (2013.01); *H01M 4/386* (2013.01); *H01M 4/587* (2013.01); *H01M 4/628* (2013.01); *H01M 10/052* (2013.01); *H01M 10/0525* (2013.01); *H01M 12/08* (2013.01); *H01M 2004/027* (2013.01); *H01M 2004/028* (2013.01); *Y02T 10/70* (2013.01)

(58) Field of Classification Search
CPC ......... H01M 2004/028; H01M 4/0402; H01M 4/133; H01M 4/134; H01M 4/1393; H01M 4/1395; H01M 4/364; H01M 4/366; H01M 4/382; H01M 4/386; H01M 4/587; H01M 4/628; Y02E 60/10; Y02T 10/70

See application file for complete search history.

(56) References Cited

U.S. PATENT DOCUMENTS

| | | |
|---|---|---|
| 4,981,672 A | 1/1991 | deNeufville et al. |
| 6,168,884 B1 | 1/2001 | Neudecker et al. |
| 9,755,264 B2 | 9/2017 | Martin et al. |
| 2004/0018424 A1 | 1/2004 | Zhang et al. |
| 2006/0154141 A1* | 7/2006 | Salot ............... H01M 10/052 429/149 |
| 2008/0044732 A1 | 2/2008 | Salot et al. |
| 2009/0176158 A1 | 7/2009 | Ugaji et al. |
| 2011/0070480 A1 | 3/2011 | Hahn et al. |
| 2013/0078508 A1 | 3/2013 | Tolbert et al. |
| 2013/0115512 A1 | 5/2013 | Jiang et al. |
| 2013/0252101 A1 | 9/2013 | Zhou et al. |
| 2014/0106203 A1 | 4/2014 | Shih et al. |
| 2016/0013477 A1 | 1/2016 | Egerton et al. |
| 2016/0233489 A1 | 8/2016 | Uhm et al. |

OTHER PUBLICATIONS

Dudney, N.J., et al., "Solid state thin-film lithium battery systems," Current Opinion in Solid State and Materials Science 4, pp. 479-482, 1999.

Neudecker, B.J., et al., ""Lithium-Free" Thin-Film Battery with In Situ Plated Li Anode," Journal of The Electrochemical Society, vol. 147(2), pp. 517-523, 2000.

Extended European Search Report for European Application No. 15827300.3, dated Nov. 24, 2017.

International Preliminary Report on Patentability and Written Opinion of the International Searching Authority issued in PCT/US2015/042635, dated Feb. 9, 2017.

\* cited by examiner ously. The present invention relates to electrodes for use in energy storage systems.

SCALABLE SILICON ANODES AND THE ROLE OF PARYLENE FILMS IN IMPROVING ELECTRODE PERFORMANCE CHARACTERISTICS IN ENERGY STORAGE SYSTEMS

CROSS REFERENCE TO RELATED APPLICATIONS

This application is a divisional application of U.S. patent application Ser. No. 15/326,736 filed Jan. 17, 2017, which is a national phase entry of International Patent Application No. PCT/US2015/042635 filed Jul. 29, 2015, which claims the benefit of U.S. Provisional Patent Application No. 62/031,169 filed Jul. 31, 2014, the contents of which are incorporated by reference as if disclosed herein in their entireties.

FIELD OF THE INVENTION

The present invention relates to electrodes for use in energy storage systems.

BACKGROUND OF THE INVENTION

Research and development activities in advanced energy storage systems capable of high energy densities have assumed primary importance over the last few years owing to a drastic rise in feature-intensive consumer electronics, the advent of electric vehicles as well as the need to secure a reliable grid storage system for the society. A number of electrode materials and battery chemistries have already been investigated by the community in an effort to identify the best solution for such high energy demands. Some of the most promising technologies in this regard include (a) silicon anodes in lithium ion batteries, (b) lithium sulfur batteries, and (c) lithium air batteries. However, the path to commercialization of these materials and technologies is still confronted with significant fundamental challenges.

Lithium Ion Batteries

One of the most common energy storage systems in use today is the lithium ion battery. Graphitic anodes are typically incorporated in commercial lithium ion batteries. Graphite is capable of a net theoretical capacity of 370 mAh/g, translating to an energy density of 100-200 Wh/kg. In addition to a relatively low net theoretical capacity, graphitic anodes also suffer from high irreversible first cycle capacity loss. During the first lithium insertion and extraction cycle (i.e., lithiation/delithiation), the electrolyte reacts to form an electrochemical interface with the anode to form what is known as a solid electrolyte interface or SEI. The irreversible loss of electrolyte and lithium in the first cycle leads to a loss of 20% or more of the theoretical capacity of the energy storage system. The SEI, however, forms a protective barrier to prevent further reaction between the electrolyte and anode and subsequent cycle losses are low.

Silicon anodes have been studies as an alternative to graphite. Silicon possesses a net capacity as high as 4200 mAh/g with the potential to offer energy densities that are an order of magnitude higher than commercial graphitic anodes, rendering silicon an ideal alternative to graphite. However, silicon anodes present different challenges that have yet to be overcome. During lithium insertion and extraction, silicon undergoes tremendous volume expansion/contraction on the order of 280-400% depending on the structure of the silicon. This expansion and contraction causes the structures to fail prematurely through pulverization and delamination.

Additionally, silicon forms an unstable SEI with the electrolyte which leads to extensive loss of active materials. Unlike graphitic anodes, in which a stable SEI is formed during the first cycle and prevents further reaction between the electrolyte and anode in subsequent cycles, the SEI on silicon anodes breaks down and reforms during each lithiation/delithiation cycle, leading to substantial loss of capacity.

Attempts at countering the effects of the expansion/contraction effects of silicon have been directed to nanostructuring the silicon. Nanoscale silicon has been used to limited success. Current nanostructured silicon anodes use nanowires, which have a tendency to fan out or fold back on themselves, which leads to a decrease in the space between the nanowires. Therefore, the current nanostructured silicon anodes are limited to 300 nm thickness before the expansion and contraction of the silicon leads to pulverization of the silicon.

Delamination of the silicon is also an issue, causing the silicon to delaminate from the underlying current collector, rendering the silicon useless.

The resulting effect of the aforementioned limitations is that silicon-based anodes generally suffer from poor cycle life and drastic capacity fade, making them unstable for commercial applications.

Lithium Sulfur Batteries

Lithium sulfur batteries offer a theoretical capacity as high as 1700 mAh/g and a theoretical energy density as high as 2600 Wh/kg and have been considered to be an ideal solution for grid storage. Commercialization of lithium sulfur batteries is however significantly constrained by the precise chemical reactions that occur between lithium and sulfur at the carbon-sulfur cathode site.

Lithium sulfur batteries store energy through the interaction of lithium and sulfur that eventually form lithium sulfides ($Li_2S$). However, prior to the formation of lithium sulfides, the chemical reaction initially produces lithium polysulfides ($Li_2S_8$, $Li_2S_6$, $Li_2S_4$, and $Li_2S_2$). Lithium polysulfides are generally soluble in the electrolyte and tend to flow out of the cathode and dissolve in the electrolyte. This process is commonly referred to as lithium polysulfide dissolution and causes significant loss of active material, poor recharging capacity, and limited cycle life, thereby limiting its adoption by the industry. As shown in FIG. 4, ~42% of the capacity is contributed by the formation of various lithium polysulfides while the remaining capacity is contributed by insoluble lithium sulfides. The large percentage of capacity contributed by the lithium polysulfides accounts for a large drop in capacity due to lithium polysulfide dissolution. FIG. 5 shows the voltage profile of a standard lithium sulfur battery.

In addition, lithium sulfur batteries also undergo expansion and contraction during the charge/discharge cycle. When a lithium sulfur battery is completely discharged, the volume of sulfur expands as much as 200%.

Researchers have attempted to address the issues of lithium sulfur batteries by altering the battery chemistry to avoid formation of lithium polysulfides in the first place or by confining lithium polysulfides within nanoscopic pores in the carbon-sulfur cathode to prevent dissolution in the electrolyte. These methods, however, can be complex and are economically or environmentally feasible.

Lithium Air Batteries

Lithium air batteries have been considered to be an ideal alternative to lithium ion batteries in automotive applications owing to their excellent theoretical energy densities (11,140 Wh/kg), which approaches the practical achievable energy densities of an internal combustion engine.

Lithium air batteries also have the ability to implement unlimited ambient air as the active reaction species (thereby offering a potential to lower the cost/kWh significantly), and the fast reaction kinetics of the lithium-oxygen interaction allows high power densities to be achieved when required.

The mechanism in a lithium air battery involves the flow of lithium ions from a lithium anode to a carbon-based air cathode where it reacts with oxygen in ambient air to produce lithium peroxide and lithium oxide, as shown in the equations below, $$4Li^+O_2 + 4e^- \rightleftharpoons 2Li_2O \quad (1); \text{ and}$$

$$2Li^+O_2 + 2e^- \rightleftharpoons Li_2O_2 \quad (2)$$

The reactions occur at the air cathode site. However, using ambient air also exposes lithium metal to undesired side reactions with moisture and carbon dioxide that causes it to irreversibly form lithium hydroxide and lithium carbonate at the anode, thereby limiting its cycle life and net achievable capacities. This further adds to concern regarding safety characteristics of the lithium anode in lithium air batteries.

The use of ambient air also poses a fire hazard in lithium air batteries. Lithium is highly combustible and reacts with water to form hydrogen. Therefore, if a lithium air battery is punctured or damaged, there is a risk that the electrolyte will leak and the lithium anode is exposed to ambient air and the moisture present in the air causing the lithium to combust.

The present invention attempts to solve one or more of the problems with current energy storage systems and provide energy storage systems that have improved capacity and fade resistance.

SUMMARY OF THE INVENTION

One aspect of the present invention relates to an electrode for an energy storage system comprising a material chosen from silicon, graphene-silicon composite, carbon-sulfur, and lithium, wherein the material has a coating of parylene.

Another aspect of the present invention relates to an energy storage system comprising an electrolyte and an electrode, wherein the electrode comprises a parylene coating.

Yet another aspect of the present invention relates to an energy storage system comprising a nanostructured silicon electrode. The nanostructured silicon may have a thickness of at least 300 nm and/or a void density of at least 20%.

Still another aspect of the present invention relates to a method of making an electrode for an energy storage system comprising providing a material chosen from silicon, graphene-silicon composite, carbon-sulfur, and lithium, and forming a coating of parylene on the material.

A further aspect of the present invention relates to the use of parylene as a coating of an electrode in an energy storage system to reduce initial capacity fade.

DETAILED DESCRIPTION OF EMBODIMENTS OF THE INVENTION

Figure 1:
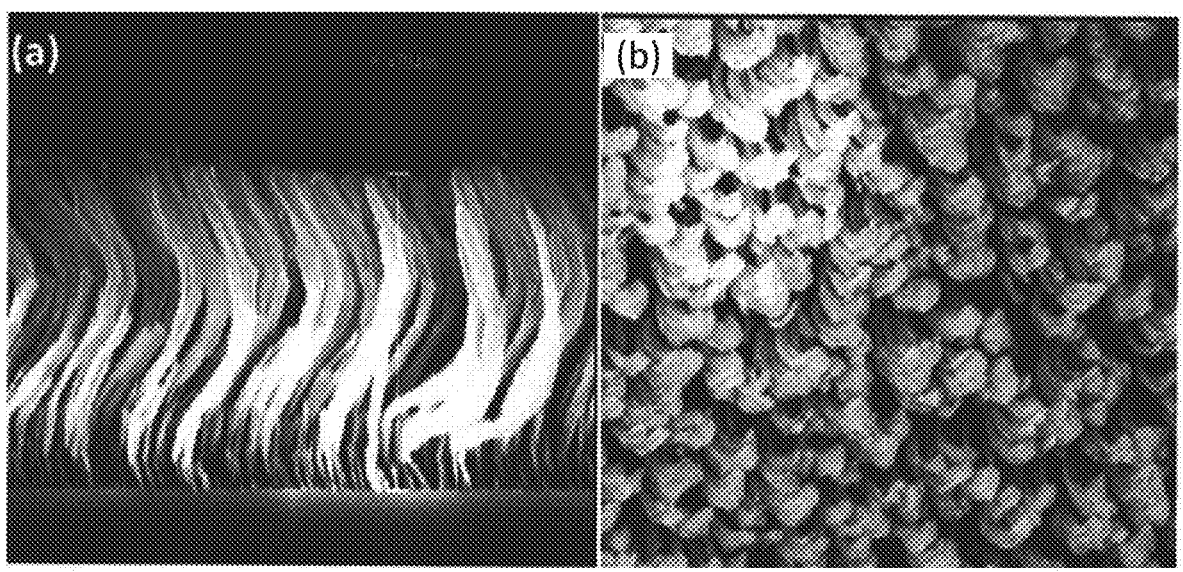
FIG. 1 shows (a) cross section and (b) top view SEM images of a nanostructured silicon having a spiral geometry in accordance with an embodiment of the invention.

As used herein, the term "parylene" refers to any poly (xylylene) polymer. Examples of parylenes includes, but not limited to, parylene N, parylene C, and parylene AF-4, which have the following structures:

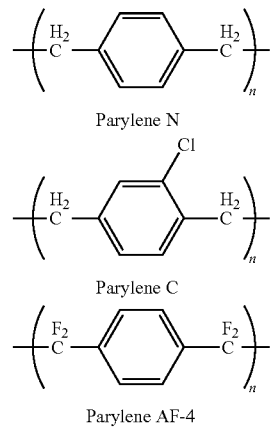

Electrodes according to embodiments of the present invention comprise a coating of parylene. Parylene can form a conformal coating on the electrode regardless of the shape of the electrode. The parylene coating may be formed by any known method, such as, for example, chemical vapor deposition.

Parylene does not react with electrolytes typically used in energy storage systems, such as lithium-based storage systems including lithium ion batteries, lithium sulfur batteries, and lithium air batteries. Additionally, lithium ions can easily diffuse through the parylene coating.

Because parylene can form a coating free of pinholes, the parylene coating may form a physical barrier preventing contact between the electrode and the electrolyte. Without wishing to be bound by theory, it is believed that the parylene coating forms an artificial solid electrolyte interface (SEI). Therefore, the parylene coating may reduce the loss in capacity resulting from the formation of an SEI layer by preventing the electrolyte from reacting with the electrode. In conventional electrodes, SEI formation can lead to first cycle losses of 20% or more.

The parylene coating may also provide structural rigidity to the electrode. For example, parylene C has a resistance to tensile elongation of as much as 300%. In lithium ion batteries, silicon expands and contracts during the lithiation/delithiation cycle by ~280-400%, which leads to delamination and pulverization of the silicon. By coating a silicon electrode with a conformal coating of parylene, the parylene can provide structural rigidity to the silicon electrode and prevent delamination and pulverization.

In lithium sulfur batteries, lithium polysulfides ($Li_2S_8$, $Li_2S_6$, $Li_2S_4$, and $Li_2S_2$) are initially produced before lithium sulfide ($Li_2S$) is formed. The lithium polysulfides are soluble in the electrolyte and flow out of the carbon-sulfur cathode. This lithium polysulfide dissolution causes significant loss of active material, poor recharging capacity, and limited cycle life.

A parylene coating on the carbon-sulfur cathode in a lithium sulfur battery may prevent the flow of lithium polysulfides out of the carbon-sulfur cathode. By containing the lithium polysulfides, the active material is contained within cathode, which may allow the lithium polysulfides to form lithium sulfide and maintain the recharging capacity and cycle life of the battery.

Parylene is also a hydrophobic material. In lithium air batteries, where contact between the lithium and moisture from the air can lead to combustion, the parylene coating may form a waterproof barrier.

According to at least one embodiment, the parylene coating has a thickness ranging from about 1 nm to about 20 nm, such as, for example, from about 5 nm to about 20 nm, or from about 10 nm to about 20 nm. The thickness of the parylene coating can depend on the desired properties. A thicker coating may provide additional protection against contact between the electrolyte or other compounds and the electrode, and a thinner coating may minimize the amount of material used and minimize the diffusion rate of the lithium ions through the parylene coating. A thinner parylene coating may also have less effect on the gravimetric energy density of the electrode. In some embodiments, a coating less than 1 nm may be used, and in other embodiments, a coating greater than 20 nm may be used.

The parylene may be coated in the desired thickness, or the parylene may be annealed after deposition to reduce the thickness through loss of carbon during annealing.

Another aspect of the present invention relates to nanostructured silicon electrodes.

According to at least one embodiment, the electrode may comprise nanostructured silicon. Nanostructuring the silicon may allow for expansion and contraction of the silicon during the lithiation/delithiation cycles. The present inventors have found that nanostructuring by itself does not necessarily provide resistance to pulverization through expansion and contraction. Structures such as nanowires can fan out or fold back on themselves, reducing the space available for expansion and contraction.

In at least one embodiment, the nanostructured silicon has a void density of at least 15%, such as, for example, at least 20%, at least 25%, or at least 30%. In other embodiments, the void density may be greater. A greater void density provides more room for expansion of the nanostructured silicon during lithiation.

As used herein, the terms "void density" and "porosity" are used interchangeably to describe the amount of space within the nanostructured silicon. For example, nano-rods having a diameter of 50 nm spaced 25 nm apart would have a void density of greater than 33%.

In at least one embodiment, the nanostructured silicon has a thickness of greater than 300 nm. In at least one further embodiment, the nanostructured silicon has a thickness of at least 1 µm or more.

According to at least one embodiment, the nanostructured silicon has an electrode mass loading of at least 0.5 $mg/cm^2$, such as, for example, 1 $mg/cm^2$ or at least 2 $mg/cm^2$. In at least one embodiment, the nanostructured silicon has an electrode mass loading of 2 to 5 $mg/cm^2$.

The geometry of the nanostructured silicon is not limited. The nanostructured silicon can have the shape of rods, wires, springs, spirals, pillars, spheres, etc. In at least one embodiment, the nanostructured silicon has a spiral structure. The spiral structure may provide the nanostructured silicon with the ability to longitudinally expand during lithiation and delithiation process.

Nanostructured silicon may be formed by any known method. For example, nanostructured silicon can be formed using physical vapor deposition (PVD) techniques such as sputtering and e-beam deposition.

In another embodiment, the nanostructured silicon may comprise silicon particles. The particles may be bound to a surface, such as a current collector or an adhesion promoting surface using a binder. After deposition on the surface, the nanoparticles may then be coated with a parylene coating.

According to at least one embodiment, the electrode comprises an adhesion promoting layer. The adhesion promoting layer may improve the adhesion of the electrode material and the current collector. For example, an adhesion promoting layer comprised of chromium or titanium may be used to improve the adhesion of silicon to a current collector made of copper. The adhesion promoting layer may be selected based on the adhesion properties of the current collector and electrode material. Chromium is an inactive material in lithium ion batteries and does not participate in lithium intercalation or alloying kinetics and is hence free from volume changes during charge/discharge. Chromium also displays excellent charge transfer characteristics that may improve the rate capability.

The adhesion promoting layer may be applied as a thin film. For example, the adhesion promoting layer may having a thickness ranging from 1 nm to about 50 nm, such as about 5 nm to about 30 nm. In other embodiments, the adhesion promoting layer may be thinner than 1 nm or thicker than 50 nm depending on the materials used.

In at least one embodiment, the electrode may comprise a carbon-silicon composite, such as a graphene-silicon composite. Other forms of carbon may also be used, including, but not limited to, nanotubes, fullerenes, and pyrolytic graphite. In the carbon-silicon composite, the carbon may coat the silicon.

According to at least one embodiment, a graphene-silicon composite may be formed by preparing a solution of graphene oxide dispersed in ethanol or water at concentration ranging from 1 mg/mL to 20 mg/ml, and adding the dispersion to silicon nanoparticles. In at least one embodiment, the silicon nanoparticles may have a particle size ranging from 2 nm to 4 µm. The ratio of graphene oxide to silicon may be varied between 5%:95% to 95%:5% (by weight). Graphene oxide, with its oxygen moieties, tends to wrap around the silicon nanoparticles, interacting with the native oxide layer of the silicon nanoparticles, and forms a coating. The viscous suspension of graphene oxide-silicon composite can then be applied to a metallic current collector (copper, aluminum, nickel, etc.). The suspension can be applied using any of the known manufacturing techniques including but not limited to (a) doctor-blading, (b) slot-die coating, (c) spray deposition, and (d) electrophoretic deposition. The graphene oxide-silicon composite may then be reduced by application of thermal or photo-thermal energy, as described in U.S. Patent Application Publication No. 2014/0050910, which is hereby incorporated by reference.

Alternatively, the graphene oxide-silicon composite may be reduced prior to its application current collector. The ethanol suspension can be dried out to obtain graphene oxide-silicon composite in powder form, and then reduced using thermal or photo-thermal energy on the powder. It is also understood that reduction of graphene oxide can be performed in a liquid phase as well, using various chemical techniques. The reduction provides a graphene-silicon composite material that may be used as an anode in a lithium ion battery configuration. In addition, a conformal thin layer of parylene may be coated on to the graphene-silicon or graphene oxide-silicon composite.

The graphene-silicon composite can be annealed to help control capacity loss. For example, the carbon-silicon compositions may be annealed at a temperature ranging from 300° C. to 900° C. under a flowing inert gas, such as, for example, argon, nitrogen, or helium. The carbon-silicon composition may be annealed for about 1 to 6 hours.

In accordance with at least one embodiment, following the annealing treatment, the anodes may be pre-lithiated by bringing them in contact with a lithium metal foil, in the presence of an electrolyte and under the application of a compressive force. The annealed and pre-lithiated anodes can then be assembled in a half-cell (against a lithium metal foil) or full-cell (against commercial cathodes) configuration.

The annealing and/or pre-lithiation treatment may help prevent the capacity loss. In at least one embodiment, annealing and/or pre-lithiation treatment may also be used with other anode materials including carbon, tin, tin oxide, aluminum, germanium, silicon, and composites of the same.

EXAMPLES

Nanostructured Silicon

Micron long silicon spirals were grown through conventional physical vapor deposition techniques (specifically, sputtering and e-beam) as shown in FIG. 1. The spirals displayed an intrinsic spring constant that allowed for its volume change in the longitudinal direction. The silicon spirals did not display the fanning out phenomenon observed in nanowires and hence significantly longer structures could be fabricated while effectively maintaining the space between adjacent structures.

The spiral geometry alone allowed for longer cycling as compared to films and nano rods of similar thickness when the thickness was maintained below 300 nm. Beyond this 300 nm thickness, delamination due to poor adhesion at the silicon-current collector interface began to play a dominant role, leading to a rapid loss in capacity.

Adhesion Promoting Layer

In order to improve adhesion of silicon, a thin film (~30 nm) of chromium was deposited onto a copper current collector prior to deposition of the silicon spirals. The silicon spirals were then deposited on top of the chromium layer. Chromium was found to enhance the adhesion between silicon and the current collector, improving the cycling ability considerably. Incorporation of a very thin layer of chromium does not add significantly to the mass of the anode and thus, the gravimetric energy density and power density were not affected.

Figure 2:
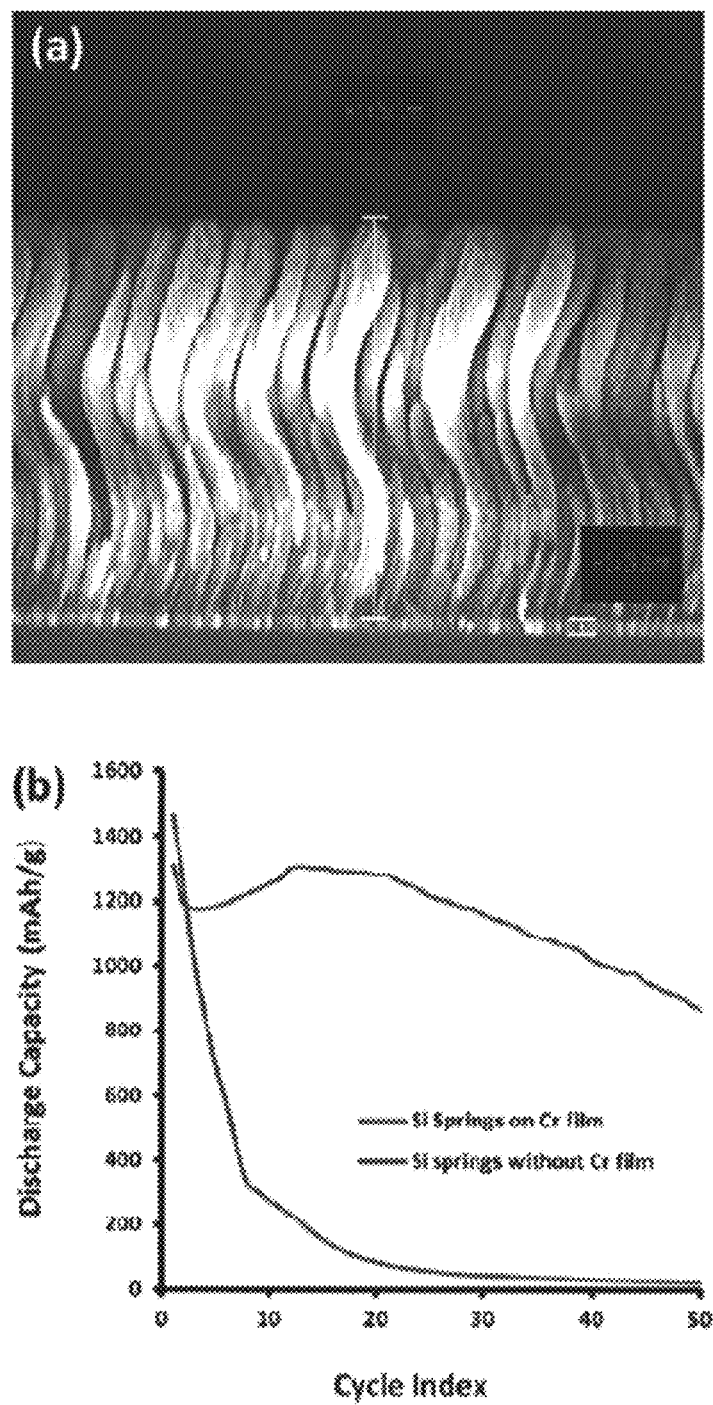
FIG. 2 shows (a) a cross section SEN image of nanostructured silicon spirals deposited via 45° step rotation on top of a thin film of chromium in accordance with an embodiment of the invention; (b) a comparison of discharge capacities of nanostructured silicon spirals with and without a chromium adhesion promoting layer.

Adding a chromium adhesion promoting layer enabled 70% retention in capacity at the end of 50 cycles of charge/discharge (see FIG. 2). In comparison, silicon spirals without a chromium layer displayed almost 0% capacity retention at the end of 50 cycles of charge/discharge.

Parylene Coating on Nanostructured Silicon Spirals

Parylene-N was initially tested as a coating layer for silicon spirals. Different thicknesses of parylene and annealing conditions were tested with the objective being to identify the thinnest optimum coating that would suppress SEI formation while simultaneously allowing lithium ions to diffuse through and accommodating volume expansion of silicon.

Figure 3:
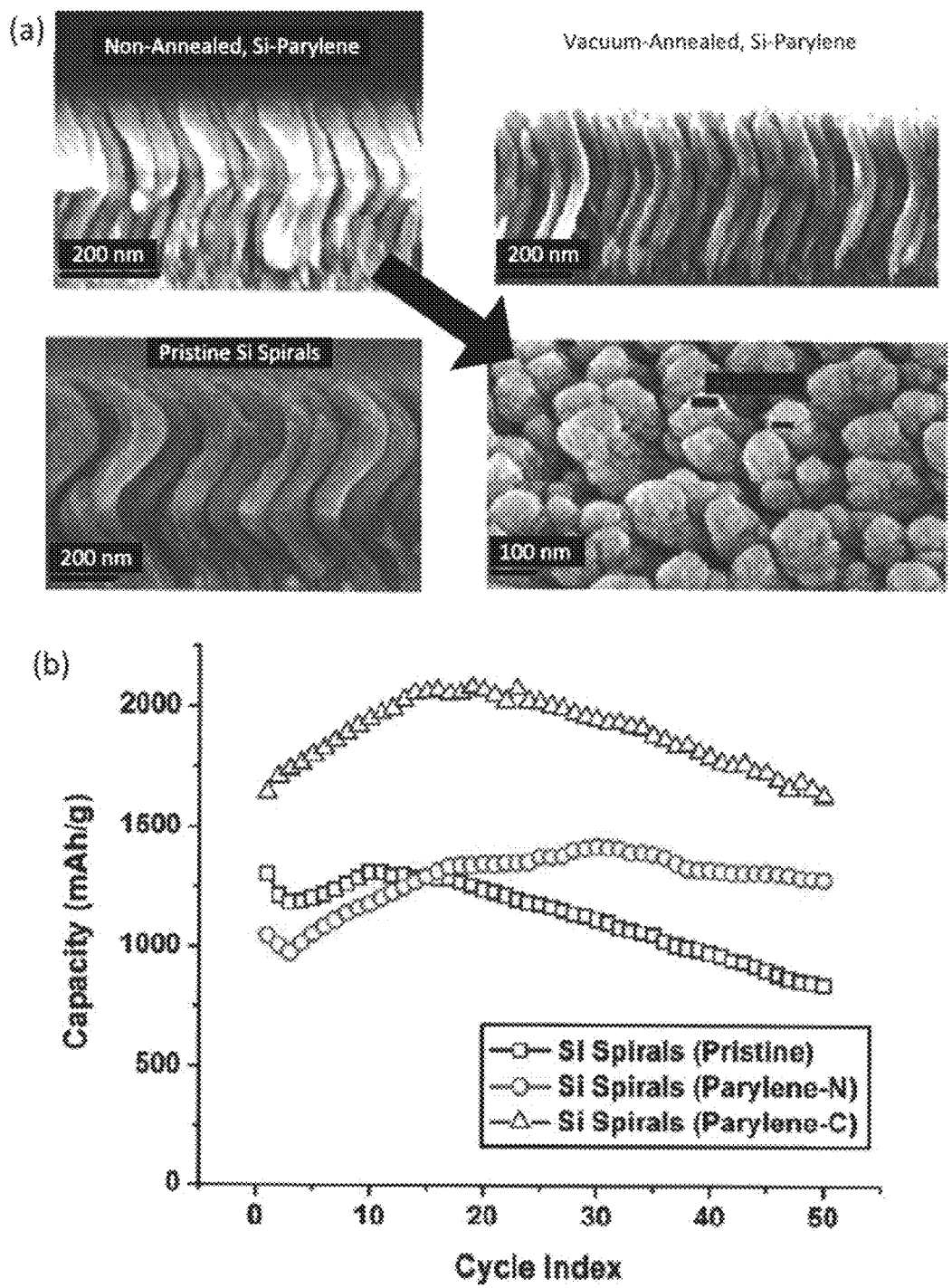
FIG. 3 shows (a) nanostructured silicon spirals coated with parylene with and without annealing in accordance with an embodiment of the invention; (b) discharge characteristics of nanostructured silicon spirals coated with Parylene N and Parylene C coatings and uncoated nanostructured silicon spirals.
Figure 4:
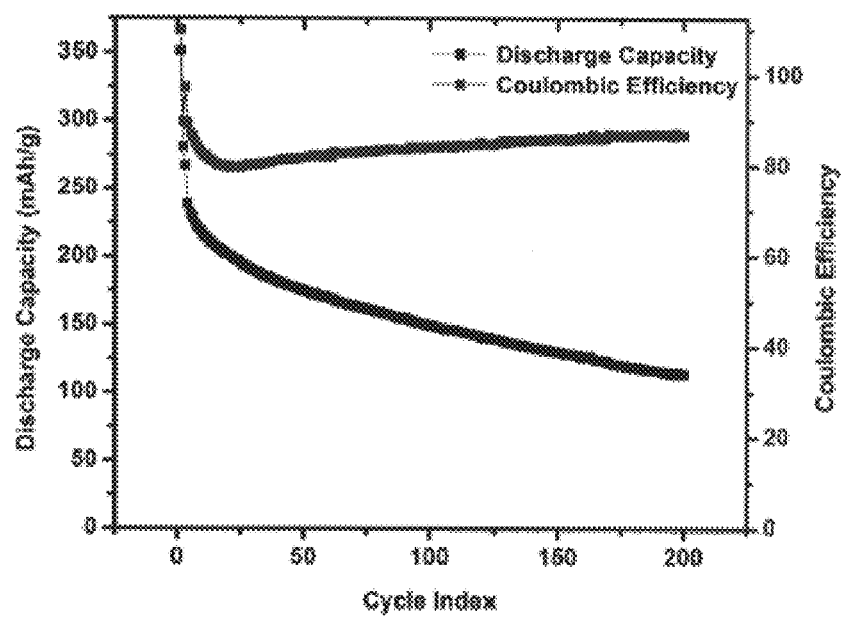
FIG. 4 shows the loss in achievable capacity in lithium sulfur batteries using graphene-wrapped sulfur cathodes.
Figure 5:
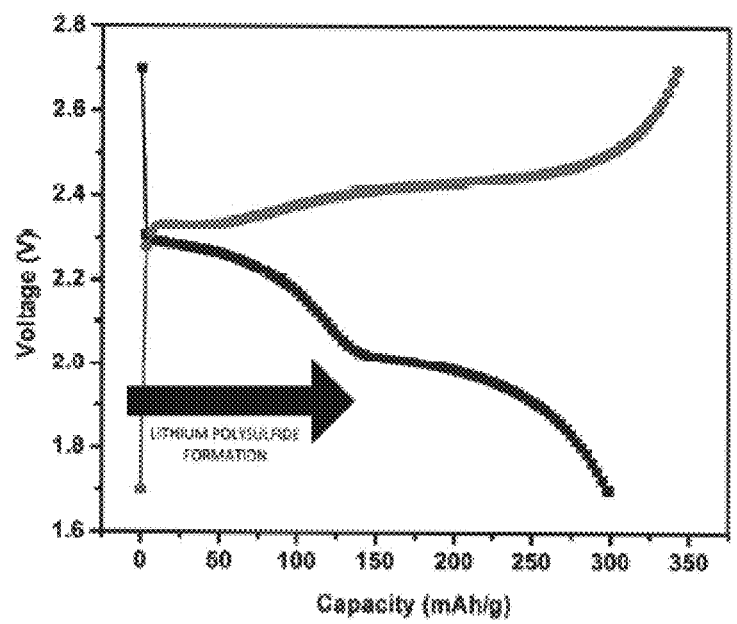
FIG. 5 shows the voltage profile of a graphene-wrapped sulfur tested as a cathode in a lithium sulfur battery.

Incorporation of a parylene coating in the previous example further improved the capacity retention to 80% after 100 charge/discharge cycles at a rate of 0.5 C (see FIG. 3). These results were attributed to passivating characteristics of parylene that would effectively inhibit the formation of an SEI layer and in effect, act as an artificial SEI layer that had been pre-formed with the anode. This was confirmed by fundamental electrochemical impedance spectroscopy (EIS) studies that revealed an interfacial resistance of 169Ω that remained stable throughout cycling. Moreover, the charge transfer resistance of parylene coated silicon was as low as 21Ω, thereby suggesting that in addition to SEI inhibition, parylene also accommodated the volume change in silicon and allowed for efficient intercalation between silicon and lithium.

In addition to Parylene-N, Parylene-C was also tested for its effectiveness in inducing a stable electrochemical interface and structural stability to silicon. Parylene-C has a resistance to tensile elongation of as much as 300% and is also a passivating agent and would thus continue to inhibit the formation of an SEI layer.

Silicon-Carbon Composite

Figure 6:
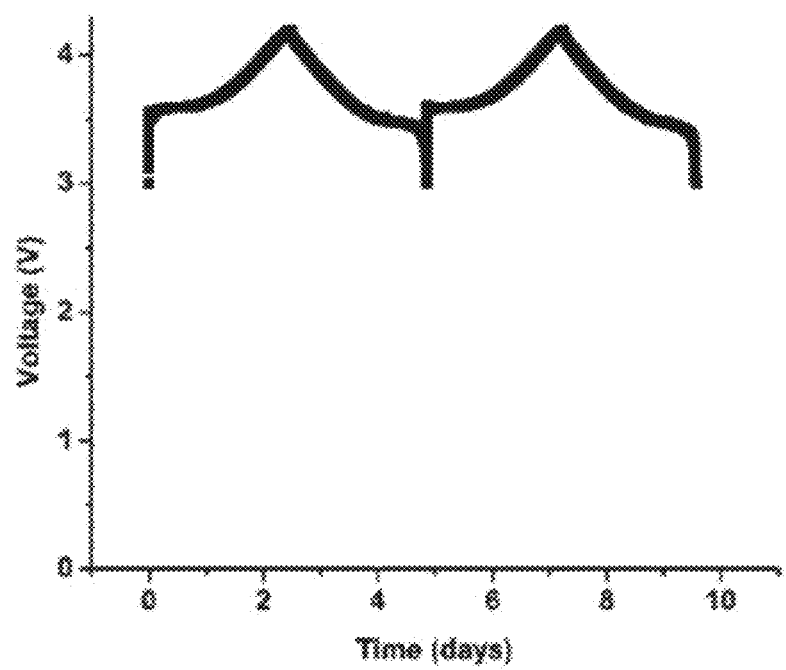
FIG. 6 shows the voltage profile of a graphene-silicon composite anode against a lithium cobalt oxide cathode in accordance with an embodiment of the invention.
Figure 7:
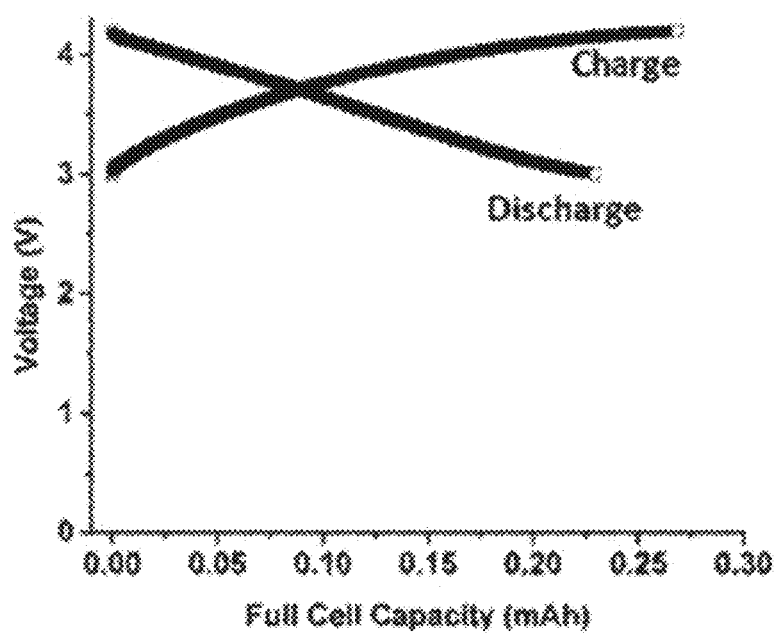
FIG. 7 shows the first cycle capacity loss of silicon-carbon composite anodes that have been annealed and pre-lithiated in accordance with an embodiment of the invention.

Graphene-silicon composites synthesized according to the method disclosed above provided energy densities in excess of at least 400 Wh/kg and power densities of at least 200 W/kg (in a half-cell configuration against a lithium metal foil) and a volumetric energy density of at least 500 Wh/L (in a full-cell configuration against a lithium cobalt oxide cathode). In a full-cell configuration against a standard lithium cobalt oxide or lithium iron phosphate cathode, the graphene-silicon composite anodes worked efficiently within the regular operating window of lithium ion batteries (3-4.2 V) (see FIG. 6). As shown in FIG. 7, carbon-silicon composite anodes that were annealed and pre-lithiated in accordance with methods disclosed herein displayed a first-cycle capacity loss as low as 15%.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method of making an electrode for an energy storage system having an electrolyte, the method comprising:
   providing a material chosen from silicon, graphene-silicon composite, carbon-sulfur, or lithium, the material having a thickness greater than 300 nm; and forming a coating of parylene on the material such that the parylene coating forms a physical barrier preventing contact between the electrode and the electrolyte.

2. The method according to claim 1, wherein providing a material chosen from silicon, graphene-silicon composite, carbon-sulfur, or lithium comprises coating silicon with graphene oxide and reducing the graphene oxide to form a graphene-silicon composite.

3. The method according to claim 1, wherein providing a material chosen from silicon, graphene-silicon composite, carbon-sulfur, or lithium comprises forming nanostructured silicon having a void density of at least 20%.

4. The method according to claim 3, wherein the void density is at least 30%.

5. The method according to claim 3, wherein the nanostructured silicon has a spiral geometry.

6. The method according to claim 1, wherein the parylene is chosen from parylene N, parylene C, or parylene AF-4.

7. The method according to claim 1, wherein the parylene coating has a thickness ranging from about 1 nm to about 20 nm.

8. The method according to claim 1, further comprising:
providing a current collector; and
providing an adhesion promoting layer positioned between the current collector and the material chosen from silicon, graphene-silicon composite, carbon-sulfur, or lithium.

9. The method according to claim 8, wherein the adhesion promoting layer comprises chromium or titanium.

\* \* \* \* \*